SMITH & PERRY.
Seed Planter.
No 20,738.
Patented June 29, 1858.
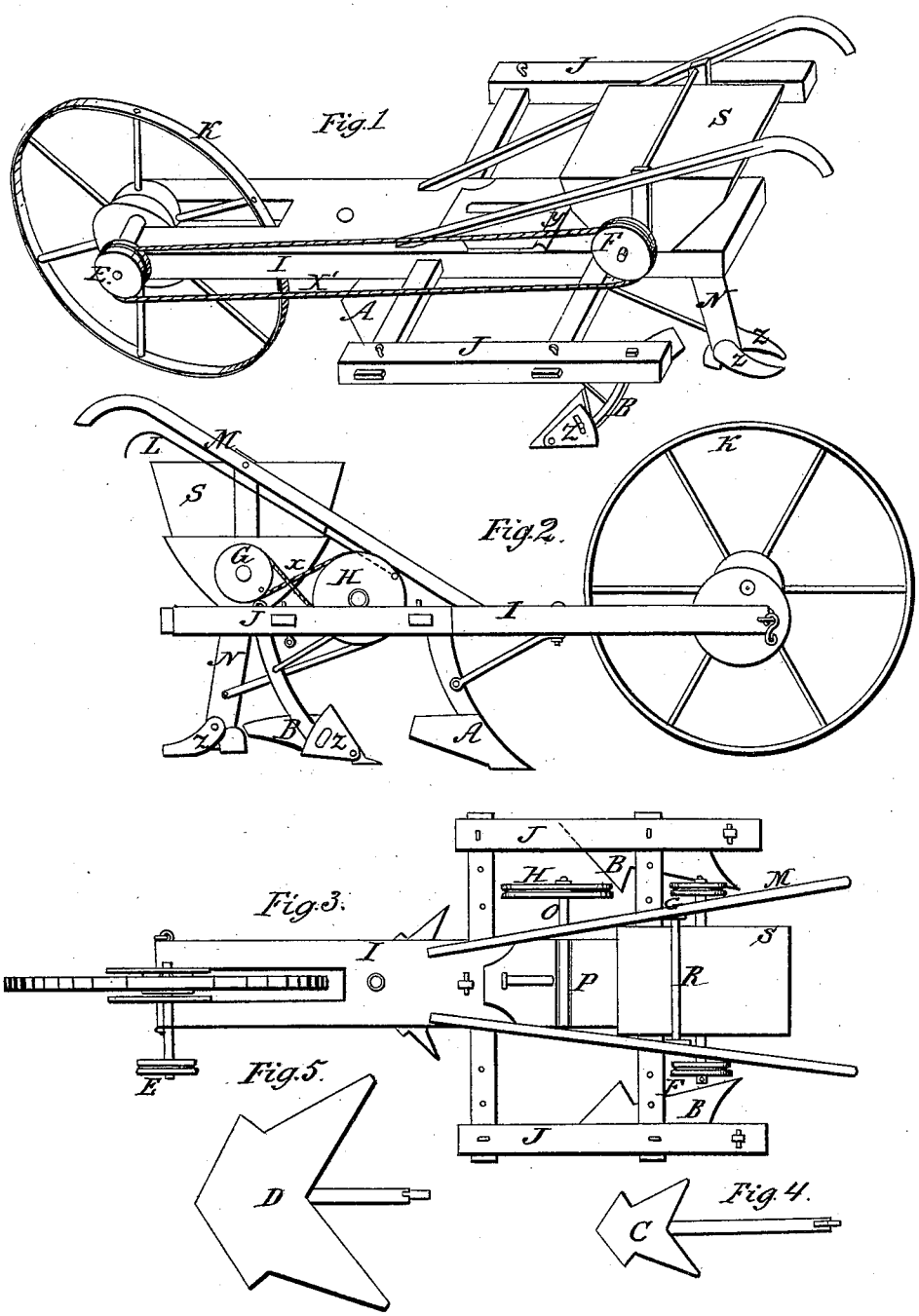

UNITED STATES PATENT OFFICE.

G. SMITH AND A. G. PERRY, OF CLYDE, OHIO.

IMPROVEMENT IN SEED-PLANTERS.

Specification forming part of Letters Patent No. 20,738, dated June 29, 1858.

*To all whom it may concern:*

Be it known that we, GEO. SMITH and A. G. PERRY, of Clyde, in the county of Sandusky and State of Ohio, have invented a new Combined Corn-Planter and Cultivator; and we hereby declare the following to be a true and exact description of the same, reference being had to the drawings herewith presented, which drawings constitute a part of said description.

The nature of our invention consists principally in the construction, combination, and arrangement of the several parts of a hill and row corn-planter with a cultivator, so as to be readily adjusted and adapted to the purposes of, first, a seed-drill; secondly, a hill and row planter; thirdly, a ridging-plow; fourthly, a leveling-cultivator; fifthly, a hilling-plow; and, sixthly, a shovel-plow.

In order to enable others to make and use our invention, we proceed to describe its construction and use, as follows:

Figure 1 is an isometrical view of the machine as used for a drill. I is the main beam. J and J are the two movable stocks which support the teeth or colters on each side. K is a gage-wheel. A is the forward tooth. B and B are two right and left teeth as when used for a drill.

Fig. 2 is a side view, and Fig. 3 is a top view, of the same.

Similar letters refer to like parts in each section or figure.

The pulley E is attached to the shaft of the wheel K and drives the pulley F on the seed-wheel. G is a pulley on the opposite side of the seed-wheel, and is driven by the band $x$ leading from the pulley H, which last is turned by a spring, P, placed in the box Y. This spring, being attached to the box and also to the pulley, is drawn up by hand at proper time and left to recoil, and thereby turns the seed-wheel and plants a hill at pleasure of the operator by the wire hook or lever L under the handle M. (Seen at Fig. 2, which is a side view showing the penstock N, which leads the seed from the seed-wheel down to the ground.)

Fig. 4 shows the teeth C and C, used as presently to be described.

Fig. 5 is the tooth D, to be used as a shovel-plow. The wings Z at the bottom of N are adjustable by moving upward or downward at pleasure, and those also on the teeth B, which serve as colters and landside.

It should be observed, in using this implement, first, as a seed-drill, we use the band on the pulleys E and F with the teeth, as seen in the drawings, Fig. 1.

Secondly, when used as a hill-planter we cast off the band from E and F and put on the cross-band X on the pulleys G and H. (Seen at Fig. 2.) The attendant then draws up the wire hook L under the handle M, which is attached to the pulley, and lets the spring recoil at the proper time, turning the pulley H, and with it by band X turns the pulley G so far as is requisite to drop the seed in the hill. There is a pin in the pulley G, that should be pushed in far enough to hit the post that the shaft runs in, so as to stop the seed-wheel always in the right position.

Thirdly, a ridging-plow. Cast off the bands, put in the teeth A and B as they now are, and you have a ridging-plow. This is also used for cultivating corn the first time through.

Fourthly, a leveling-cultivator. Take out the teeth B and put in the teeth C, and you have a leveling-cultivator. This we use generally for the second time through.

Fifthly, a hilling-plow. Take out the teeth C and put in teeth B, reversed right and left, and you have a hilling-plow. This we use the last time through.

Sixthly, a shovel-plow. Take out all the teeth and put in tooth D in a hole in the frame near the hopper, and you have a shovel-plow.

The great advantage of having an implement capable of being used with facility in all those forms, so compact and convenient, must be obvious to every observer, while the thing is also cheap and durable.

What we claim as our invention, and desire to secure by Letters Patent, is—

The shaft O, spring P, adjustable spring-box Y, pulley H, lever L, seeding-cylinder R, hopper S, and the cultivator, as described, when the whole are constructed and arranged for operation conjointly in the manner and for the purposes set forth.

GEO. SMITH.
A. G. PERRY.

Witnesses:
W. H. REYNOLDS,
JESUA PARKER.